(12) United States Patent
Toya

(10) Patent No.: US 7,154,255 B2
(45) Date of Patent: Dec. 26, 2006

(54) CONSUMABLE PRODUCT AND DEVICE FOR IDENTIFYING THE SAME

(75) Inventor: Shoichi Toya, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/934,572

(22) Filed: Sep. 7, 2004

(65) Prior Publication Data

US 2005/0052188 A1     Mar. 10, 2005

(30) Foreign Application Priority Data

Sep. 10, 2003  (JP)  ............................ 2003-318692
Jun. 14, 2004  (JP)  ............................ 2004-176186

(51) Int. Cl.
*G01R 19/00*     (2006.01)

(52) U.S. Cl. ........................................ 324/66; 320/106

(58) Field of Classification Search ................ 324/426, 324/433, 66; 320/106
See application file for complete search history.

(56) References Cited

U.S. PATENT DOCUMENTS

| | | | | |
|---|---|---|---|---|
| 4,598,258 A | * | 7/1986 | Babano | ........................ 331/14 |
| 5,416,423 A | * | 5/1995 | De Borde | .................... 324/677 |
| 5,657,388 A | * | 8/1997 | Weiss | .......................... 713/185 |
| 5,912,544 A | * | 6/1999 | Miyakawa et al. | ......... 320/106 |
| 5,945,803 A | * | 8/1999 | Brotto et al. | ............... 320/106 |
| 6,037,777 A | * | 3/2000 | Champlin | ................... 324/430 |
| 6,215,274 B1 | * | 4/2001 | Dotzler | ........................ 320/106 |
| 6,809,649 B1 | * | 10/2004 | Wendelrup et al. | ...... 340/636.1 |
| 7,003,410 B1 | * | 2/2006 | Bertness et al. | .............. 702/63 |
| 7,089,420 B1 | * | 8/2006 | Durst et al. | ................. 713/176 |

FOREIGN PATENT DOCUMENTS

| | | | |
|---|---|---|---|
| GB | 1235384 | * | 6/1971 |
| JP | 5-198293 | | 8/1993 |

* cited by examiner

*Primary Examiner*—Anjan Deb
(74) *Attorney, Agent, or Firm*—Wenderoth, Lind & Ponack, L.L.P.

(57) ABSTRACT

A device for identifying consumable products including a main unit including an electronic circuit, and a consumable product detachably connected to the main unit. The consumable product includes a property-varying analog element whose analog value of electric property continuously varies when connected to the main unit and applied with a current. The main unit includes a current-applying portion for applying the current to the property-varying analog element of the consumable product, and a detecting portion for detecting the varying electric property of the property-varying analog element, which is applied with the current by the current-applying portion. With this device, in the state that the consumable product is connected to the main unit, the detecting portion of the main unit detects the time-varying electric property of the property-varying analog element of the consumable product, and identifies whether the consumable product is an authorized product or a substandard product based on the detected electric property.

26 Claims, 4 Drawing Sheets

CONSUMABLE PRODUCT AND DEVICE FOR IDENTIFYING THE SAME

BACKGROUND OF THE RELATED ART

1. Technical Field

The present invention relates to a device which identifies whether a consumable product connected to electrical equipment is an authorized product or a substandard product.

2. Description of Related Art

It is necessary for electrical equipment to attach a consumable product, which satisfies a predetermined standard. The reason is that electrical equipment may not operate properly, or may be damaged, or may not be used safely, if a substandard consumable product is attached thereto. To achieve attachment of a consumable product within the standard to electrical equipment, a system, which identifies whether a consumable product attached to electrical equipment is an authorized product or a substandard product, has been developed: (see Patent Document 1)

Patent Document 1: Japanese Laid-Open Patent Publication TOKUKAI No. HEI 5-198293

A consumable product disclosed in this document is connected to electrical equipment through a communication terminal. When a consumable product is attached to the electrical equipment, the electrical equipment transmits a request signal through the communication terminal. When receiving the request signal, the consumable product provides process data calculated from this signal through the communication terminal. The electrical equipment checks the process data provided from the consumable product, and identifies whether the consumable product is an authorized product or a substandard product.

In the system, which identifies whether a consumable product is an authorized product or a substandard product as mentioned above, a substandard product may provide the same process data as the authorized product. The reason is that the request signal provided from the electrical equipment into the consumable product and the process data provided from the consumable product into the electrical equipment can be determined by detecting signals passing through the communication terminal. For this reason, a manufacturer can manufacture substandard consumable products, which provide process data similarly to an authorized consumable product. This causes a problem that users wrongly use such substandard consumable products as authorized consumable products.

In this system, complicating relation between the request signal and process data can more surely detect substandard products. However, even if the request signal and process data are complicated, the system has certain relation between the request signal and process data. Accordingly, if this relation is determined, the process data to be calculated from the request signal can be obtained. For this reason, even if relation between the request signal and process data is highly complicated, substandard products cannot be detected in ideal condition. In addition, if relation between the request signal and process data is complicated, a circuit for calculating this relation is also complicated. This causes increase of component cost. As a result, there is a disadvantage that the cost of a component for identifying whether an authorized product or a substandard product becomes high. Such a component for identifying whether an authorized product or a substandard product does not serve as essential operation of an electrical equipment unit and a consumable product. Accordingly, it is important to surely detect substandard products with as low cost as possible.

SUMMARY OF THE INVENTION

The present invention has been developed for solving the disadvantage. It is an important object to provide a device for identifying consumable products which can surely identify whether an authorized product or a substandard product so as to effectively prevent users from using substandard products.

A device for identifying consumable products according to the present invention comprises a main unit including an electronic circuit, and a consumable product detachably connected to the main unit. The consumable product includes a property-varying analog element whose analog value of electric property continuously varies when connected to the main unit and applied with electricity. The main unit includes an electricity-applying portion for applying the electricity to the varying property-varying analog element of the consumable product, and a detecting portion for detecting the electric property of the property-varying analog element, which is applied with the electricity by the electricity-applying portion. With this device, in the state that the consumable product is connected to the main unit, the detecting portion of the main unit detects the time-varying electric property of the property-varying analog element of the consumable product, and identifies whether the consumable product is an authorized product or a substandard (it means a not authorized product, a product out of standard, or the like.) product based on the detected electric property.

The foregoing device for identifying consumable products has an advantage to surely identify whether an authorized product or a substandard product with very low cost. The reason is that the foregoing identification device includes the property-varying analog element whose analog value of electric property continuously varies when applied with electricity, and the installed detecting portion detects the varying electric property of the property-varying analog element. Thus, identification whether an authorized product or a substandard product is performed. The electrical property of the property-varying analog element does not varied by digital processing. The property-varying analog element is an element whose analog value of electric property continuously varies as time elapses when applied with electricity by the current applying portion installed in the main unit. Although various manufacturing conditions can specify the electrical property of this property-varying analog element, the manufacturing conditions cannot be specified from the electrical property. For this reason, even if the electrical property of the property-varying analog element is detected, the same property-varying analog element cannot be manufactured based on this detection. Particularly, the foregoing identification device does not detect the electrical property under a certain conditions at only a certain occasion, but detects the state that the electrical property varies and thus identifies whether an authorized product or a substandard product. As a result, even if the electrical property is detected, a property-varying analog element having the same property cannot be easily manufactured. In addition, the foregoing identification device detects the variation of electrical property of the property-varying analog element, and thus identifies whether an authorized product or a substandard product. Although it is necessary to manufacture property-varying analog elements under predetermined conditions, they will have the same electrical property as long as the manufacturing conditions are same. Accordingly, it is possible to mass-manufacture property-varying analog elements cheaply. It is not necessary for a property-varying analog element to have a complex circuit configuration such as a digital circuit. For this reason, the foregoing identification device employs a very simple and cheap component, additionally, its circuit configuration is simple, however, it is possible to surely prevent installation of the same property-varying analog element as an authorized product to a substandard product. Therefore, the foregoing identification device has an advantage that users can properly, safely and comfortably use equipment with preventing damage or the like by effectively preventing for users from using substandard products.

The property-varying analog element can be an element whose electrical property varies according to the time period where the current is applied as a parameter, an element whose electrical property varies according to the applied current as a parameter, an element whose electrical property varies according to the applied voltage in the state that the current is applied as a parameter, an element whose capacitance varies as the electricity is applied, an element whose electrical resistance varies as the electricity is applied, or an element whose inductance varies as the electricity is applied.

The electricity-applying portion of the main unit can be a circuit which applies a constant current to the property-varying analog element, a circuit which applies a current varying based on a function of time to the property-varying analog element, a circuit which applies a pulse current to the property-varying analog element, a circuit which applies a varying voltage to the property-varying analog element, or a circuit which applies a constant voltage to the property-varying analog element.

The detecting portion of the main unit can perform detection of the electric property of the property-varying analog element at a plurality of times in elapsed time. The detecting portion can detect the variation of electric resistance of the property-varying analog element.

The property-varying analog element and a voltage dividing resistance are connected to each other in series, and power is supplied thereto, so that the voltage applied to the property-varying analog element is detected.

A consumable product according to the present invention detachably connected to a main unit including an electronic circuit comprises a property-varying analog element whose analog value of electric property continuously varies when connected to the main unit and applied with a current, wherein in the state that the consumable product is connected to the main unit, the time-varying electric property of the property-varying analog element of the consumable product is detected by the main unit, and the consumable product is identified whether an authorized product or a substandard product based on the detected electric property.

The above and further objects and features of the invention will be more fully apparent from the following detailed description in conjunction with the accompanying drawings.

DETAILED DESCRIPTION OF THE PREFERRED EMBODIMENTS

Figure 1:
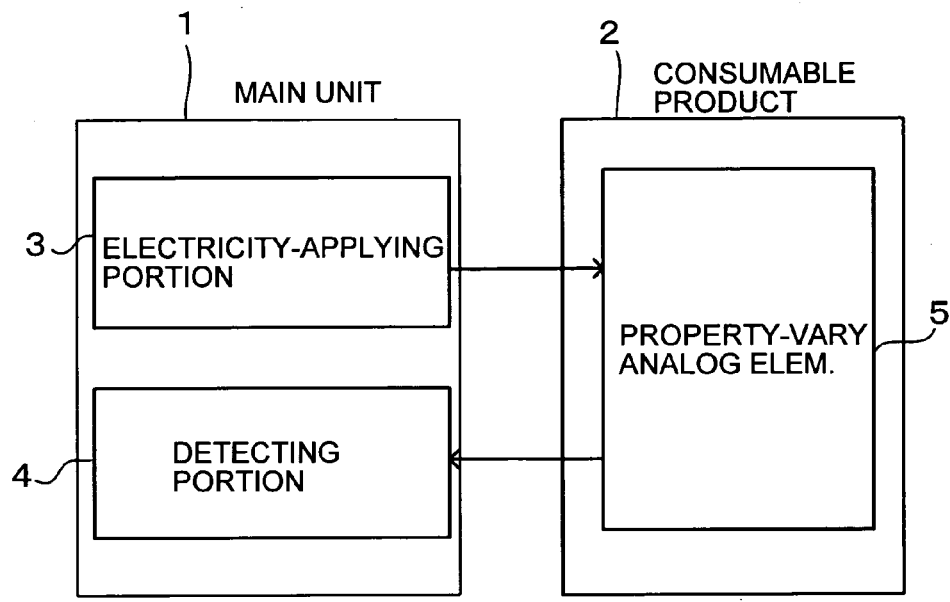
FIG. 1 is a schematic view showing a device for identifying consumable products according to one embodiment of the present invention.

A device for identifying consumable products shown in FIG. 1 comprises a main unit 1 including an electronic circuit, and a consumable product 2 detachably connected to the main unit 1. The consumable product 2 is a product detachably connected to the main unit 1 such as the battery pack for supplying power to electrical equipment, a toner or ink cartridge attached to a printer which is electrical equipment. However, the main unit and consumable product according to the present invention are not specifically limited. Any products, which are detachably connected to a main unit and replaced by a new one after used in a certain time period, can be used as the consumable product.

The main unit 1 includes an electricity-applying portion 3 for applying electricity as a current, a voltage, or, a power to a property-varying analog element 5 of the consumable product 2, and a detecting portion 4 for detecting the varying electric property of the property-varying analog element 5, which is applied with the electricity by the electricity-applying portion 3. The consumable product 2 includes the property-varying analog element 5 whose analog value of electric property continuously varies when connected to the main unit 1 and applied with the electricity by the electricity-applying portion 3.

The property-varying analog element 5 installed in the consumable product 2 can be an element whose electrical property varies according to the time period where the electricity is applied as a parameter, an element whose electrical property varies according to the applied current as a parameter, or an element whose electrical property varies according to the applied voltage in the state that the current is applied as a parameter or the like.

An element whose electric resistance varies according to the temperature such as a thermistor or varistor, a coil whose inductance varies according to the temperature, or a capacitor whose capacitance varies according to the temperature can be used as the element whose electrical property varies according to the time period where the current is applied as a parameter. The temperature of the property-varying analog element rises when a current is applied in long time period. The reason is that heat is generated by Joule heat when the current is applied. Accordingly, with the element whose electric resistance varies according to the temperature, the temperature rises when a current is applied in long time period, thus the electric resistance varies. An element such as a thermistor whose electric resistance decreases when the temperature is high, or an element such as a varistor whose electric resistance increases when the temperature is high can be used as the element whose electric resistance varies according to the temperature. The temperature of a coil also rises when a current is applied in long time period. The reason is that its wire rod extends, thus its inductance varies when the temperature rises. When a coil is made of a metal wire rod with high electric resistance and coefficient of thermal expansion, its inductance can highly vary according to the temperature. A coil made of a metal wire rod whose shape bends or curls such as a bimetallic strip can be used as the coil. Its inductance also varies according to the temperature. A capacitor generates heat due to dielectric loss when an alternating current is applied. Its capacitance varies when the temperature rises due to the generated heat.

An element such as a thermistor or varistor whose electric resistance varies according to the temperature, a coil whose inductance varies according to the temperature, or a capacitor whose capacitance varies according to the temperature can be also used as the element whose electrical property varies according to the amount of an applied current as a parameter. The temperature of the property-varying analog element rises when the amount of an applied current is large. The reason is that the temperature rises due to Joule heat. Accordingly, with the element whose electric resistance varies according to the temperature, the temperature rises when the amount of an applied current is large, thus the electric resistance varies. A thermistor or a varistor can be used as the elements whose electric resistance varies according to the temperature. When a large amount of current applied to a coil, the temperature rises due to Joule heat. Accordingly, its wire rod extends when the temperature rises, thus its inductance varies. When a high frequency is applied to a capacitor so that a large amount of alternating current flows, the amount of generated heat increases due to a large amount of dielectric loss. Its capacitance varies when the temperature rises due to the generated heat.

The element whose electrical property varies according to the applied current as a parameter can be also used as the element whose electrical property varies according to the amount of the applied voltage in the state that the current is applied as a parameter. The reason is that a current applied to the property-varying analog element increases when an applied voltage increases. Besides, a variable capacitance diode (varicap) can be used as a property-varying analog element whose capacitance highly varies according to a voltage as parameter. The capacitance of this capacitor can be varied according to the applied voltage. Accordingly, it is possible to highly vary capacitance without flowing a current in the property-varying analog element.

The electricity-applying portion 3 applies an electric current to the property-varying analog element 5. The electricity-applying portion 3 applies a constant current or voltage to the property-varying analog element 5, or applies a current or voltage, which varies based on a function of time, to the property-varying analog element 5. The electricity-applying portion 3 that applies a current varying based on a function of time gradually increases or decreases the applied current or voltage. The electricity-applying portion 3 may not continuously apply a current or voltage but intermittently apply a current or voltage in a pulse manner.

The detecting portion 4 detects the varying electrical property of the property-varying analog element 5, and identifies whether the consumable product 2 is an authorized product or a substandard product. When the property-varying analog element 5 is an element whose electric resistance varies, the detecting portion 4 detects the electric resistance of the property-varying analog element 5, and identifies whether an authorized product or a substandard product. When the property-varying analog element 5 is an element whose coil inductance varies, the detecting portion 4 detects the inductance, and identifies whether an authorized product or a substandard product. The inductance can be obtained by calculation from a resonance frequency detected by connecting a capacitor with a certain capacitance to the coil, or an impedance detected based on the voltage applied between the both ends of the coil, the flowing current and the frequency of the applied alternating current. When the property-varying analog element 5 is an element capacitor's capacitance of which varies, the capacitance can be obtained by calculation from a resonance frequency detected by connecting a coil with a certain inductance to the capacitor, or an impedance detected based on the voltage applied between the both ends of the capacitor, the flowing current and the frequency of the applied alternating current.

The detecting portion 4 performs detection of the electric property of the property-varying analog element 5 at a plurality of times in elapsed time. The detecting portion 4 detects the electrical property of the property-varying analog element 5 preferably at three times or more, and identifies whether an authorized product or a substandard product. As the number of events for identifying the electric property of the property-varying analog element 5 by the detecting portion 4 is increased, it is possible to more accurately identify whether an authorized product or a substandard product. The detecting portion 4 detects the electrical property of the property-varying analog element 5 as an absolute value or relative value, or as a variation rate, and identifies whether an authorized product or a substandard product.

Figure 2:
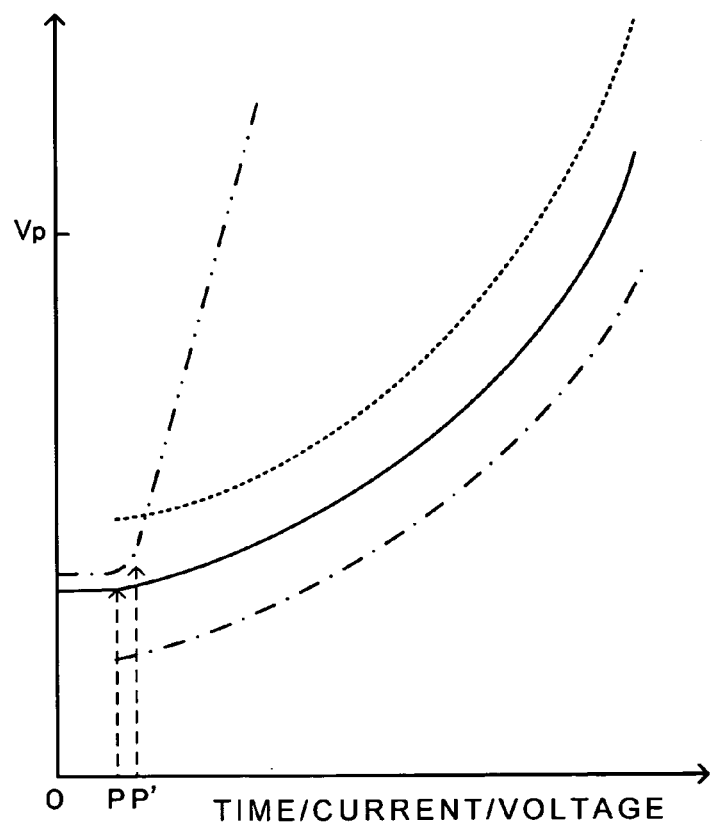
FIG. 2 is a graph showing an example of the varying electrical property of a property-varying analog element.

FIG. 2 shows an example of the varying electrical property of the property-varying analog element 5 (three types of variation shown by a dashed line, a solid line, and a single-dot-dashed line). In the property-varying analog element shown in this figure, its electrical property (vertical axis) varies as a function of time, current, voltage, and so on (horizontal axis). The detecting portion 4 detects the electrical property of the property-varying analog element 5 which varies in such a manner while shifting time or varying a current or voltage at a plurality of times, preferably three times or more in elapsed time. When the detected electrical property falls within a predetermined range, the consumable product 2 is identified as an authorized product. When the electrical property is out of the predetermined range, the consumable product 2 is identified as a substandard product.

FIRST EMBODIMENT

Figure 3:
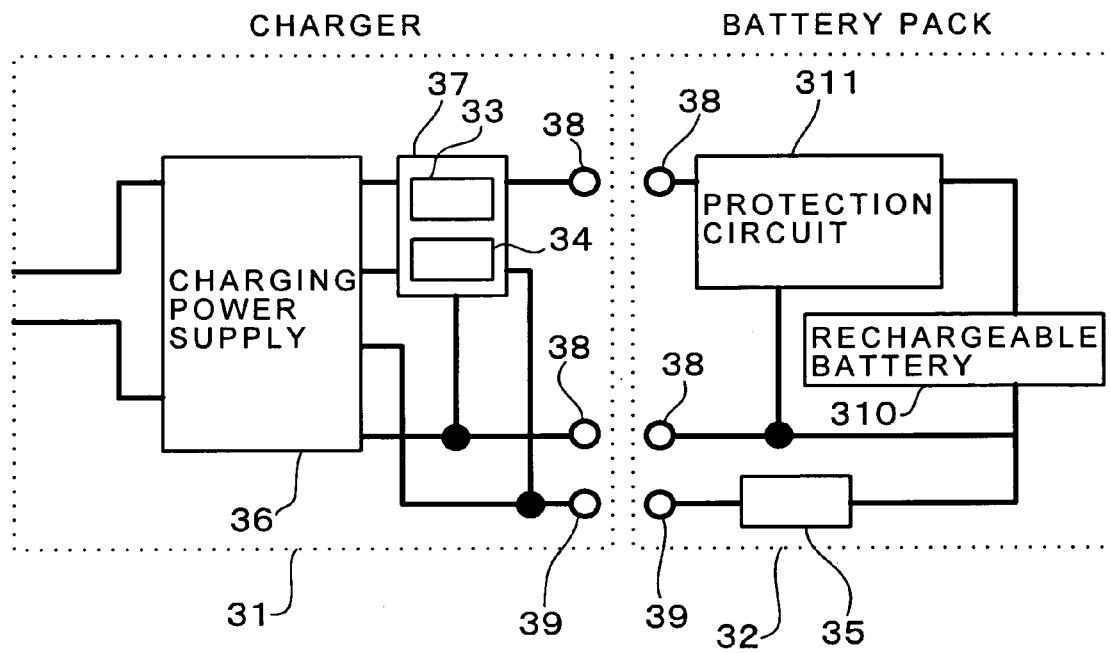
FIG. 3 is a block diagram showing an example of the device for identifying battery packs as the consumable products.

FIG. 3 shows an embodiment where a consumable product 32 is a battery pack. The battery pack is detachably connected to a charger which is a main unit 31, and is charged by the charger. The battery pack is connected to the charger in the state attached to electrical equipment, or is connected to and charged by the charger in the state where detached from electrical equipment. The charger identifies whether the connected battery pack is an authorized product or a substandard product. When the battery pack is an authorized product, the charger charges the battery pack in a normal manner. When the battery pack is a substandard product, the charger stops charging the battery pack or charges it in a restricted manner. The reason is that it is not to ensure safety of charging a battery pack which is a substandard product. The charger identifies whether an authorized product or a substandard product, while charging the battery pack attached thereto. When the battery pack is identified as an authorized product, the charger continuously charges it. When the battery pack is identified as a substandard product, the charger stops charging it or charges it in a restricted manner after the identification. Since the identification device, which identifies whether an authorized product or a substandard product while charging a battery pack, performs identification in parallel with charging, the time required for identification does not make charging time longer. For this reason, the identification can take enough time, in other words, the number of events for detecting the electrical property of the property-varying analog element 35 can be increased, therefore it is possible to more accurately identify whether an authorized product or a substandard product.

A charging power supply 36 and a charging control circuit 37 are installed in the charger which is the main unit 31. The charging control circuit 37 includes an electricity-applying portion 33 which applies an electric current to the property-varying analog element 35, and a detecting portion 34 which detects the electrical property of the property-varying analog element 35.

The charging control circuit 37 has a function to identify whether an authorized product or a substandard product based on the detection result of the detecting portion 34. The charging control circuit 37 is composed of a microcomputer or the like, and controls various functions of the main unit 31 which is the charger. The battery pack of the consumable product 32 is connected to the charger, which is the main unit 31, through positive and negative power supply terminals 38 and a communication terminal 39.

Figure 4:
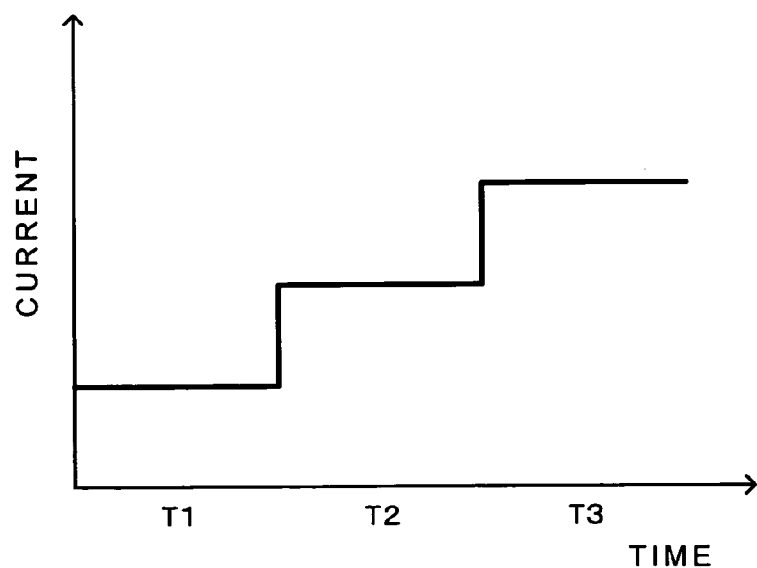
FIG. 4 is a graph showing an example of a varying current which is applied to the property-varying analog element by a current applying portion.

The electricity-applying portion 33 increases a current applied to the property-varying analog element 35 as time elapses, as shown in FIG. 4. In the case of this electricity-applying portion 33, the current is increased in a staircase manner. However, the current may be continuously increased. In other case, the current may be a pulse current whose average current is increased or decreased by varying its duty ratio.

When time elapses and reaches a predetermined time period (T1, T2, T3, T1<T2<T3), the detecting portion 34 detects the electrical property of the property-varying analog element 35, and compares the detected electrical property with a predetermined range previously stored therein. When the detected electrical property falls within the predetermined range, the battery pack is identified as an authorized product. When out of the predetermined range, the battery pack is identified as a substandard product.

The battery pack, which is the consumable product 32, includes a rechargeable battery 310, a protection circuit 311 for the rechargeable battery 310, and the property-varying analog element 35. The rechargeable battery 310 is a lithium-ion battery. However, any rechargeable batteries such as nickel-hydrogen and nickel-cadmium batteries can be used as the rechargeable battery. The protection circuit 311 is a circuit, which shuts down a current when overcurrent flows in the rechargeable battery 310, or prevents overcharge and overdischarge of the rechargeable battery 310.

Figure 5:
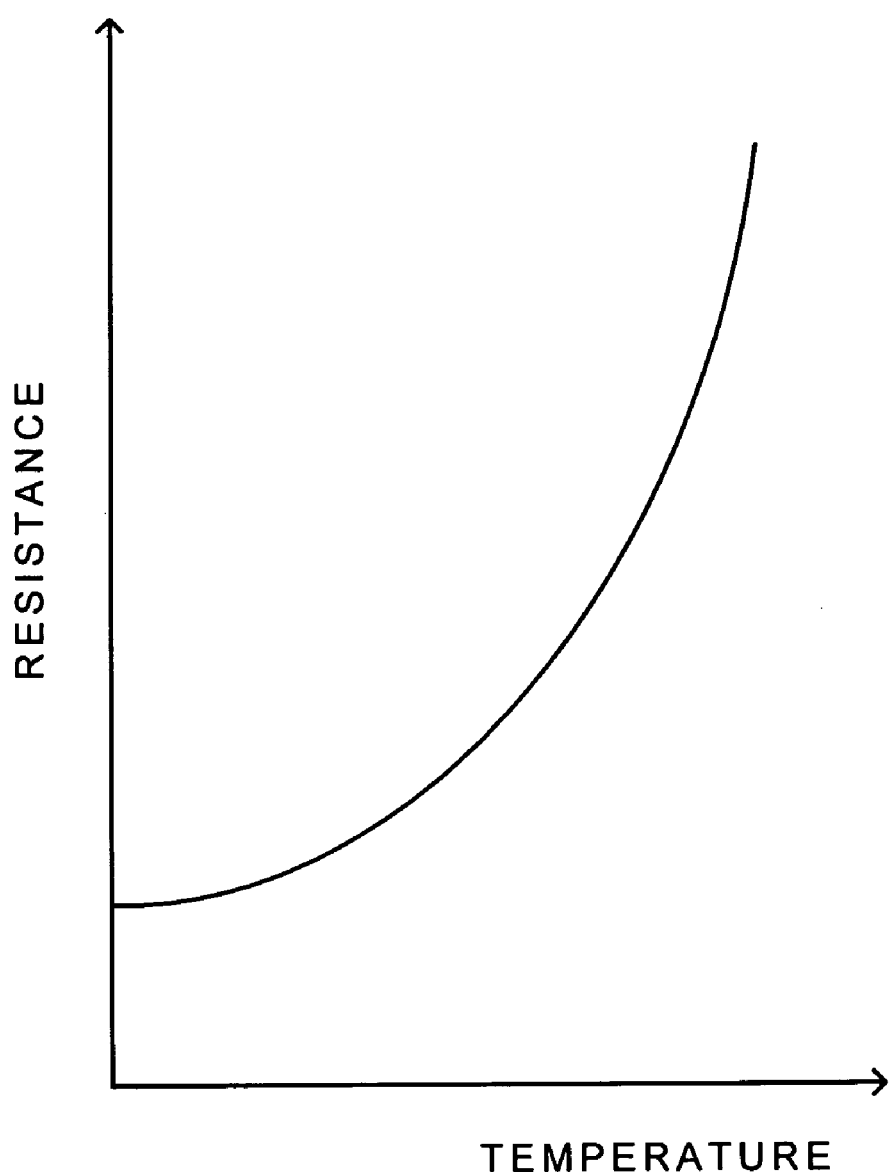
FIG. 5 is a graph showing an example of the electric resistance property of the property-varying analog element which varies with the temperature.

The property-varying analog element 35 is an element whose electric resistance increases as the temperature increase, as shown in FIG. 5. This property-varying analog element 35 self-generates heat by Joule heat when the applied current increased, thus, the temperature increases. As the temperature increases, the electric resistance gradually increases. In the property-varying analog element 35 whose electric resistance varies when the temperature becomes high as mentioned above, as the current applied thereto is gradually increased as shown in FIG. 4, the temperature increases, thus, the electrical property increases. The device, which detects the electrical property while increasing the current applied to the property-varying analog element 35, makes variation of the electric resistance larger, and thus can more accurately identify whether an authorized product or a substandard product. However, in the property-varying analog element 35 whose electrical property varies when the temperature rises, even if the current applied thereto is constant, the temperature gradually rises to a certain temperature as time elapses, thus, the electric resistance varies. Accordingly, even in the case of a constant current, the variation of the electric resistance can be detected. Therefore, the charging control circuit 37 can identify whether an authorized product or a substandard product based on the detected electric resistance.

Figure 6:
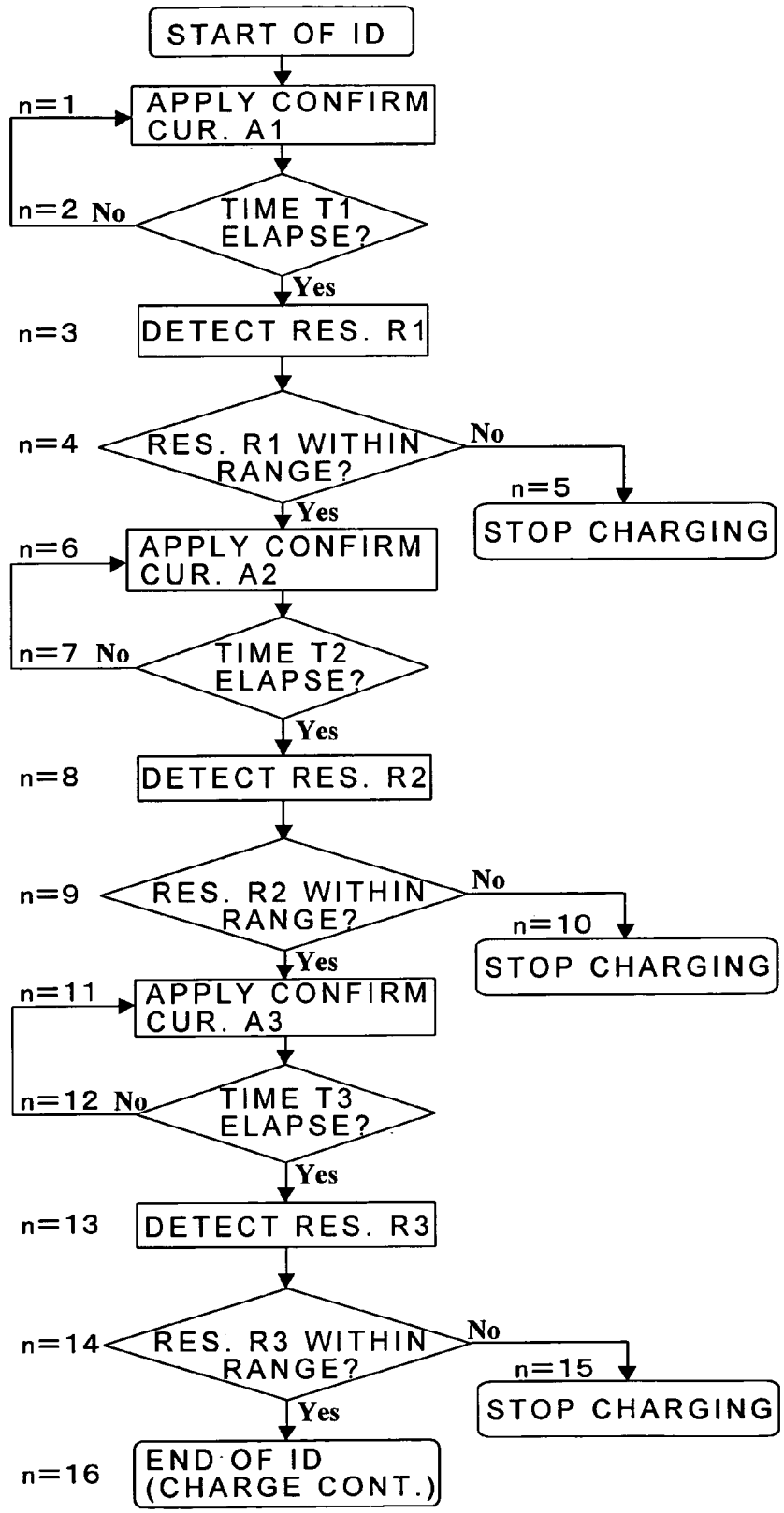
FIG. 6 is a flow chart of the device identifying whether a consumable product is an authorized product or a substandard product.

The above identification device identifies whether the consumable product 32 is an authorized product or a substandard product by using the following steps in a flow chart of FIG. 6.

(Step n=1)

The electricity-applying portion 33 applies a confirmation current A1 to the property-varying analog element 35 installed in the consumable product 32. The confirmation current A1 is applied to the property-varying analog element 35 through the communication terminal 39 and one of the power supply terminals 38. The confirmation current A1 is applied in the state where the current is applied to the rechargeable battery 310 or is not applied to the rechargeable battery 310. In the system which does not applies the confirmation current to the rechargeable battery 310, the confirmation current A1 is applied to the property-varying analog element 35, while the rechargeable battery 310 is charged with a charging current.

(Steps n=2–5)

After a predetermined time period T1 elapses, the detecting portion 34 detects the electric resistance R1 of the property-varying analog element 35. When the detected electric resistance R1 is out of the predetermined range, the battery pack, which is the consumable product 32, is identified as a substandard product, and charging is stopped.

(Step n=6)

Then, the current applied to the property-varying analog element 35 is varied from A1 to A2.

(Steps n=7–10)

After a predetermined time period T2 elapses, the detecting portion 34 detects an electric resistance R2 of the property-varying analog element 35.

When the detected electric resistance R2 is out of the predetermined range, the battery pack, which is the consumable product 32, is identified as a substandard product, and charging is stopped.

(Step n=11)

After that, the current applied to the property-varying analog element 35 is varied from A2 to A3.

(Steps n=12–16)

After a predetermined time period T3 elapses, the detecting portion 34 detects an electric resistance R3 of the property-varying analog element 35. When the detected electric resistance R3 is out of the predetermined range, the battery pack, which is the consumable product 32, is identified as a substandard product, and charging is stopped. When detected as an authorized product, the battery pack of the consumable product 32 is subsequently charged in a normal manner.

The foregoing identification device detects the absolute value of the electric resistance of the property-varying analog element 35. However, the identification device may detect the relative value or the variation rate of the electric resistance, and thus identifies whether an authorized product or a substandard product based on whether the relative value or the variation rate is within the predetermined range. In the case where a variable capacitance diode is used as the property-varying analog element 35, the battery pack can be immediately identified whether an authorized product or a substandard product without waiting that a predetermined time period elapses by detecting the capacitance after the voltage applied to the property-varying analog element 35 is switched. The reason is that the capacitance of the variable capacitance diode quickly varies when the applied voltage is varied. The detected capacitance is compared with the stored predetermined range. When the detected capacitance is within the predetermined range, the battery pack of the consumable product 32 is detected as an authorized product. On the other hand, when it is out of the predetermined range, the battery pack is detected as a battery pack of a substandard product.

Next, the following description describes construction and method for identifying whether the case where the consumable product 32 (=battery pack) of an authorized product employing an element, which is a special PTC thermistor, as the property-varying analog element 35 of this embodiment or a consumable product (battery pack) of a substandard product employing an element, which is a typical PTC thermistor.

A solid line of FIG. 2 shows the relation between the detection voltage (vertical axis of the graph) and time (horizontal axis of the graph) in the case where the property-varying analog element 35 is provided with a current by using the electricity-applying portion 33, the detecting portion 34, and the charging control circuit 37. The voltage of this case is detected as a voltage applied to the element 35 (hereinafter referred to as an "element voltage") by the detecting portion 34 in the case where a current is applied to supply electric power and a constant voltage is applied between the set of electricity-applying terminals 39 and the set of two power supply terminals 38 (the lower two power supply terminals 38 in FIG. 3) in the state the detecting portion 34 is connected to a voltage dividing resistance installed in the charging control circuit 37. In the other case, a constant current may be applied to the property-varying analog element 35 and the voltage dividing resistance, thus the element voltage is measured. The variation of the resistance of the element 35 can also be detected by calculating the resistance of the element from the element voltage and a current value which is additionally detected.

A typical PTC element exhibits the voltage property shown by a double-dot-dashed line of FIG. 2. In this case, the typical PTC element means an element of positive temperature coefficient thermistor with a property that its resistance sharply increases as the temperature rises. As a result, the resistance sharply increases as the temperature of the element rises when a current is applied, thus, the element voltage should sharply rise. As for the voltage property of the double-dot-dashed line of FIG. 2, the element voltage (that is, the electric resistance of the element) sharply rises from starting time of voltage rise P'.

On the other hand, the line of the element 35 of this embodiment, which is the special PTC thermistor, draws a gradual rise (solid line of FIG. 2) from starting time of temperature-voltage rise P as compared with that of the typical PTC element (double-dot-dashed line). That is, when the element temperature rises with an applied electricity, the resistance of the element 35 gradually increases as compared with the typical PTC element.

In this case, when the time period that reaches from the starting time of electricity-applying or temperature-voltage rise (P, P') to the time where the detected voltage of the element 35 becomes a predetermined voltage (Vp), it is possible to identify whether the element 35, which is the special PTC thermistor of this embodiment, or the typical PTC element, in other words, whether the consumable product 32 (=battery pack) is an authorized product or a substandard product.

To manufacture such a special PTC thermistor, in a typical formula and manufacturing condition of PTC thermistor, a method for reducing a sharp rise of temperature vs. resistance characteristic (=resistance-temperature characteristic) can be employed as follows. A material of $BaTiO_3$ where a part of Ba substitutes for an agent for giving semiconductor property (a rare earth element, etc.) or a shifter (Pb, Sr, etc.) and $SiO_2$ is added as a sintering agent is used as a material of the typical PTC element. Adjusting an amount of Mn added to such a material can control the rise of resistance-temperature characteristic. For example, Japanese Patent Publication TOKUkO No. SHO 63-28324 discloses that adding Mn changes resistance-temperature characteristic sharply. When the amount of added Mn is small, the resistance-temperature characteristic gradually rises.

In addition, in the above material, controlling burning conditions (cooling atmosphere and cooling speed) can control the rise of resistance-temperature characteristic. "Ceramic Dielectrics" (Publishing Company: Gakkensha, Author: Kyoshi Okazaki, page 380–381) discloses controlling burning conditions (cooling atmosphere and cooling speed) in such a manner. When cooling speed is set high in $O_2$ gas, the resistance-temperature characteristic gradually rises.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on applications No. 2003-318692 filed in Japan on Sep. 10, 2003, and No. 2004-176186 filed in Japan on Jun. 14, 2004, the contents of which are incorporated hereinto by reference.

What is claimed is:

1. A system for identifying consumable products, the system comprising:
 a main unit; and
 a consumable product detachably connected to the main unit, wherein
 the consumable product includes a property-varying analog element having a time-varying electric property that continuously varies when connected to the main unit and applied with electricity, and
 the main unit includes an electricity-applying portion operable to apply the electricity to the property-varying analog element of the consumable product, and a detecting portion operable to detect the time-varying electric property of the property-varying analog element, and to identify whether the consumable product is an authorized product or a substandard product based on the detected time-varying electric property.

2. The system of claim 1, wherein the time-varying electric property of the property-varying analog element varies according to a time period when the electricity-applying portion applies the electricity.

3. The system of claim 1, wherein the time-varying electric property of the property-varying analog element varies according to an applied current.

4. The system of claim 1, wherein the time-varying electric property of the property-varying analog element varies according to an applied voltage.

5. The system of claim 1, wherein the time-varying electric property of the property-varying analog element that varies is a capacitance of the property-varying analog element.

6. The system of claim 1, wherein the time-varying electric property of the property-varying analog element that varies is an electrical resistance of the property-varying analog element.

7. The system of claim 1, wherein the time-varying electric property of the property-varying analog element that varies is an inductance of the property-varying analog element.

8. The system of claim 1, wherein the property-varying analog element is a thermistor.

9. The system of claim 1, wherein the property-varying analog element is a varistor.

10. The system of claim 1, wherein the property-varying analog element is a coil.

11. The system of claim 1, wherein the property-varying analog element is a capacitor.

12. The system of claim 1, wherein the property-varying analog element is a variable capacitance diode.

13. The system of claim 1, wherein the electricity-applying portion is operable to apply a constant current to the property-varying analog element.

14. The system of claim 1, wherein the electricity-applying portion is operable to apply a current varying based on a function of time to the property-varying analog element.

15. The system of claim 1, wherein the electricity-applying portion is operable to apply a pulsed current to the property-varying analog element.

16. The system of claim 1, wherein the electricity-applying portion is operable to apply a varying voltage to the property-varying analog element.

17. The system of claim 1, wherein the electricity-applying portion is operable to apply a constant voltage to the property-varying analog element.

18. The system of claim 1, wherein the detecting portion is operable to detect the time-varying electric property of the property-varying analog element at a plurality of occasions over time.

19. The system of claim 1, wherein the detecting portion is operable to detect a variation of electrical resistance, as the time-varying electric property, of the property-varying analog element.

20. The system of claim 1, further comprising a voltage dividing resistance connected in series with the property-varying analog element, wherein a voltage applied to the property-varying analog element is detectable.

21. The system of claim 1, wherein the detecting portion is operable to detect the time-varying electric property of the property-varying analog element when a predetermined time period is reached from when the electricity-applying portion begins applying the electricity to the property-varying analog element of the consumable product.

22. The system of claim 1, wherein the detecting portion is operable to identify whether the consumable product is an authorized product or a substandard product by detecting whether the time-varying electric property of the property-varying analog element is within the set range.

23. The system of claim 22, wherein the detecting portion detects time-varying electric property several times to detect whether the time-varying electric property of the property-varying analog element is within the set range.

24. The system of claim 1, wherein the detecting portion is operable to identify whether the consumable product is an authorized product or a substandard product based on the detected time-varying voltage of the property-varying analog element when a predetermined time period is reach from when the electricity-applying portion begins applying the electricity to the property-varying analog element of the consumable product.

25. A consumable product for detachably connecting to a main unit, the consumable product comprising:
a property-varying analog element having a time-varying electric property that continuously varies when connected to the main unit and applied with electricity, wherein
the time-varying electric property of the property-varying analog element is detected by the main unit, and the consumable product is identified as an authorized product or a substandard product based on the detected time-varying electric property.

26. A system for identifying consumable products, the system comprising:
a main unit; and
a consumable product detachably connected to the main unit, wherein
the consumable product includes a property-varying analog element having a time-varying voltage that continuously varies when connected to the main unit and applied with electricity, and
the main unit includes an electricity-applying portion operable to apply the electricity to the property-varying analog element of the consumable product, and a detecting portion operable to detect the time-varying voltage of the property-varying analog element, and to identify whether the consumable product is an authorized product or a substandard product based on the detected time-varying voltage of the property-varying analog element.

* * * * *